United States Patent Office 3,651,020
Patented Mar. 21, 1972

3,651,020
ADDITION HOMOPOLYMERS OF DIVINYL CARBONATES
David Rhum, Westfield, and Lester Weintraub, Livingston, N.J., assignors to Air Reduction Company, Incorporated, New York, N.Y.
No Drawing. Continuation of application Ser. No. 591,091, Nov. 1, 1966. This application Nov. 7, 1969, Ser. No. 871,570
Int. Cl. C08g *17/13*
U.S. Cl. 260—77.5 UA     3 Claims

ABSTRACT OF THE DISCLOSURE

There are provided addition homopolymers of a carbonate having the formula $$\begin{array}{c} R_1\ R_3\quad\ O\quad R_3\ R_1 \\ |\ \ |\quad\ \ \|\quad\ \ |\ \ | \\ C=C-O-C-O-C=C \\ |\qquad\qquad\qquad | \\ R_2\qquad\qquad\quad R_2 \end{array}$$

wherein $R_1$, $R_2$ and $R_3$ are hydrogen, phenyl or alkyl containing up to 20 carbon atoms.

---

This application is a continuation of Ser. No. 591,091, filed Nov. 1, 1966, now abandoned.

This invention relates to novel polymers and is more particularly concerned with polymers of divinyl carbonates.

In the co-pending application Ser. No. 591,094 of David Rhum and George L. Moore, entitled "Process for the Preparation of Divinyl Carbonates," now U.S. Pat. No. 3,574,699, issued Apr. 13, 1971, and being filed con-currently herewith, there are disclosed novel divinyl carbonates of the formula set forth below.

It is an object of this invention to provide novel polymers formed from such monomers.

Thus, in accordance with this invention there are provided polymers of vinyl monomers described in said co-pending application and which can be represented by the formula $$\begin{array}{c} R_1\ R_3\quad\ O\quad R_3\ R_1 \\ |\ \ |\quad\ \ \|\quad\ \ |\ \ | \\ C=C-O-C-O-C=C \\ |\qquad\qquad\qquad | \\ R_2\qquad\qquad\quad R_2 \end{array}\qquad(1)$$

wherein $R_1$, $R_2$ and $R_3$ can be hydrogen, aryl, such as phenyl, or alkyl. The alkyl group can contain up to 20 carbon atoms, but preferably it is lower alkyl, i.e. containing up to 8 carbon atoms, such as methyl, ethyl, propyl, iso-propyl, butyl, tert-butyl, amyl, hexyl, heptyl, and octyl. The sum of $R_1$, $R_2$ and $R_3$ is preferably at most 20, and preferably at least two of $R_1$, $R_2$ and $R_3$ are hydrogen.

When all of $R_1$, $R_2$ and $R_3$ are hydrogen, the compound is divinyl carbonate, which can be represented by the formula $$CH_2=CH-O-\overset{O}{\underset{\|}{C}}-O-CH=CH_2 \qquad (2)$$

When each $R_3$ is methyl, the compound is diisopropenyl carbonate, having the formula $$\begin{array}{c} \qquad\ CH_3\quad\ O\quad CH_3 \\ \qquad\ |\quad\ \ \|\quad\ \ | \\ CH_2=C-O-C-O-C=CH_2 \end{array}\qquad(3)$$

In accordance with this invention, these novel compounds of the Formula 1 are suitably prepared by the reaction of a mercury (II) aldehyde or ketone with phosgene in the presence of a tertiary amine as catalyst, suitably in an inert medium. In the case of divinyl carbonate, this compound is suitably prepared by the reaction of mercury (II) bis-acetaldehyde with phosgene. The reaction can be represented by the following equation:

$$OHCCH_2-Hg-CH_2CHO + COCl_2 \longrightarrow$$
$$CH_2=CH-O-\overset{O}{\underset{\|}{C}}-O-CH=CH_2 + HgCl_2$$

To prepare diisopropenyl carbonate, chloro mercury acetone is reacted with phosgene in the above-specified reaction system. To prepare other compounds falling within the scope of Formula 1, phosgene is reacted with the appropriate chloro mercury ketone.

The reaction proceeds readily at room temperature and at atmospheric pressure and raising or lowering the temperature of the reaction mixture, or raising or lowering the pressure are not necessary. Any inert solvent may be employed but aliphatic ethers or aliphatic or aromatic hydrocarbon solvents, or normally liquid chlorinated hydrocarbons are preferred. Typical aliphatic ethers, which may be cyclic or acyclic, include dioxane, di-isopropyl ether, di-n-butyl ether, and the like, and typical hydrocarbon solvents include pentane, hexane, heptane, cyclohexane, methyl cyclohexane, benzene, toluene, xylene, carbon tetrachloride, and the like. Ordinarily, any inert solvent which is liquid at room temperature can be employed, the solvent suitably being selected so that it can readily be separated from the carbonate by distillation.

In carrying out the reaction, the mercury compound, solvent and catalyst are first added to the reaction vessel, and the phosgene is then gradually introduced. For the best results, anhydrous conditions are maintained.

The product divinyl carbonate is readily separated from the reaction mixture by distillation. The reagents are preferably used in 1:1 mole ratios but the ratio of mercury compound, e.g. mercury (II) bis-acetaldehyde, to phosgene generally ranges between 1.5:1 to 1:1.5, although a higher mole ratio, e.g. up to about 3:1 can be employed. The amount of tertiary amine is variable over a wide range, but preferably about one mole of amine per mole of mercury is employed, but ratios can vary in accordance with those specified above, and even beyond.

Any tertiary amine can be employed as catalyst. Typical amines include aliphatic amines such as trimethyl amine, triethyl amine, tributyl amine and the like, heterocyclic amines such as pyridine, picoline, quinoline, methyl quinoline, and the like, and aromatic amines such as N,N-dimethyl aniline, N,N-diethyl aniline, and the like.

The following examples, which are given for illustrative purposes only, serve to show the preparation of the divinyl carbonates of this invention and their polymerization.

EXAMPLE I

The reactor was a 1 l. resin kettle fitted with a stainless steel stirring shaft and blade, thermometer, gas inlet tube, and a Dry Ice cold finger condenser was connected to a nitrogen T tube which led to a Dry Ice trap and an aqueous $Na_2CO_3$ scrubber. Materials used: di-isopropyl ether, freshly distilled—275 ml. N,N-dimethyl aniline—75 ml., .59 mol. mercury bis-acetaldehyde—313.5 g., 1.1 mol. phosgene—109 g., 78 ml., 1.1 mol.

The mercury bis-acetaldehyde was prepared according to Nesmeyanov, AN, Lutzenko, IF, Khomutox, RM, Izv. Akad. Nank SSSR 8, 942 (1957).

The reactor was dried by purging with $N_2$ and heating. After cooling to room temperature, the first 3 materials were charged into the reactor.

The phosgene was first distilled from the cylinder into a calibrated tube, which was cooled in an isopropanol bath at $-10°$ C., until the volume desired (78 ml.) had condensed.

Keeping the reaction temperature at about 25° C. by means of a cooling bath, the phosgene was allowed to distill from the tube into the gas phase of the reactor from where it was readily absorbed by the reaction mixture. The phosgene addition time was 4 hrs. The mixture was finally warmed to 58° C. (over a period of 1½ hr.), and cooled.

The mixture was filtered, and the brittle mercury-containing solids were washed with di-isopropyl ether. The total di-isopropyl ether filtrate was then washed with water, 10% sulfuric acid (to remove any free amine present), 5% NaHCO₃, and finally water. The di-isopropyl ether solution was dried over anhyd. Na₂SO₄.

The dried solution was next distilled through a column packed with SS Heli-pak. Di-isopropyl ether was first removed at 31–35° C./190–80 mm., then the divinyl carbonate distilled at 40.5–43.5° C./70–75 mm., wt.—77.6 g. Conversion (based on 1 mol of mercury bis-acetaldehyde forming 1 mol of divinyl carbonate)—61.7%.

Based on vapor chromatography the divinyl carbonate was 97–99% pure.

The above-described monomers can be polymerized to form poly(divinylcarbonates), typically represented by poly(divinylcarbonate) and poly(diisopropenyl carbonate) by using the usual free-radical polymerization techniques. Polymers can be formed by bulk, in solution, or emulsion polymerization. The temperature of polymerization can be varied but is most suitably between about −40° C. and about 150° C., preferably −40° C. and 130° C. The resulting materials can be precipitated in methanol if they are not initially insoluble in the reaction medium. The polymeric products in all cases are white powders. In the case of solution polymerization, any inert solvent can be used, such as ethers, hydrocarbons, chlorinated hydrocarbons, and like solvents which are liquid under the polymerization conditions, including the solvents listed above for the preparation of monomers. Particularly suitable are the solvents used in the examples below.

Suitable as catalysts are the oil soluble free-radical catalysts such as the organic peroxides, e.g. lauroyl peroxide, tert-butyl peroxy pivalate, 2,4-dichlorobenzoyl peroxide, and benzoyl peroxide, or the azo catalysts such as disclosed in Hunt U.S. Pat. No. 2,471,959, e.g. azo-bis-isobutyronitrile, which is commercially referred to in the art as "AZN."

The structure of the polymers has been determined with the aid of infra-red spectroscopy. It has been shown that the polymerization proceeds by both linear and cyclopolymerization, using respectively, one or both vinyl groups of the monomer, to produce a polymer having linear units and cyclic units incorporated in the backbone. These structural features are shown below:

We have found that the ratio of cyclopolymerization to linear polymerization is a function of both temperature and solvent. The behavior of the pure monomer is shown in Table 1.

TABLE I

| Temperature, °C | Ratio of 5 membered ring carbonate groups to total carbonate groups—polyDVC | | | |
|---|---|---|---|---|
| | 0 | 50 | 90 | 130 |
| Solvent: | | | | |
| None | 12.5 | 22 | 32 | 37 |
| Heptane | 1.0 | | 32 | 52 |
| Ethyl acetate | 6.0 | 32 | 44 | |
| Acetonitrile | 7.0 | 51 | 61 | 70 |
| Dimethylacetamide | | | 60 | 80 |

Table I also shows the effect of solvent on the structure of the final polyDVC at different temperatures, and it is observed that the percent of 5 ring cyclic carbonate groups is from 1% to 80%. The initial concentration of monomer in the polymerization solutions was 28%.

It is thus possible to control the structure of the resultant polymer, polyDVC, and also the structure of the resultant PVA which may be made from polyDVC. Since commercial PVA made from polyvinyl acetate containing 1% or less of 1,2-glycol units, completely new types of polyvinyl alcohols, containing up to 90% of the hydroxyl groups in 1,2-glycol units may be prepared at present from polyDVC with higher ratios perhaps possible in the future.

In addition to the preparation of polyDVC, a polymer having a novel structure, it has been found that this polymer possesses desirable properties, such as being white or colorless, being stable to heat up to 250° C., being capable of easy post-curing by virtue of its unreacted vinyl groups, and being hydrolyzable to PVA. Furthermore, when being hydrolyzed to PVA, the polymer polyDVC possesses the desirable property of not, at an intermediate stage of hydrolysis, forming a taffy-like mass and thereby making difficult the completion of hydrolysis. PolyDVC is insoluble in the conventional reaction medium, methanol, used in the preparation of PVA from polyvinyl esters (in contrast to polyvinyl acetate) and the hydrolysis to PVA is carried out in a heterogeneous mixture entirely, with no agglutination, and enhanced facility.

EXAMPLE II 228 g. chloromercuryacetone, 15.5 cc. dimethyl aniline, and 400 cc. isopropyl ether were stirred in a three-neck 1 liter flask with a CO₂ condenser, and a gas inlet tube connected. The gas inlet tube was attached to a calibrated tube which in turn was connected to a cylinder

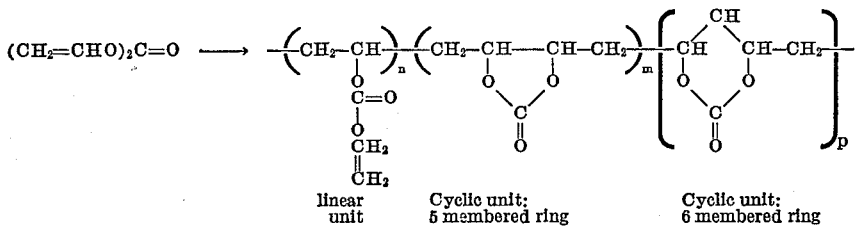

linear unit / Cyclic unit: 5 membered ring / Cyclic unit: 6 membered ring

Our studies show that the polymers consist of linear units and 5 membered ring cyclic units with few, if any, 6 membered ring cyclic units detectable. These various groups may be detected with the aid of infrared spectroscopy because each group absorbs light of a different wavelength. Thus, the 5 membered ring carbonate absorbs at 5.55 microns, the 6 membered ring carbonate and the linear carbonate at 5.72 microns, but the linear carbonate also has a free vinyl group, absorbing at 6.05 microns, absent in the 6 membered ring, by which the former may be identified.

of phosgene. The phosgene was condensed in the calibrated-tube and distilled into the reaction mixture while stirring. The reaction was then heated to 67° and kept at that temperature for 1 hour, the solid portion becoming very sticky. On cooling, the solid portion became taffy-like.

The liquid portion of the reaction mixture was filtered, and the major portion of the isopropyl ether distilled in a Vigreux column. The remaining portion was distilled at reduced pressure; the distillate of di-isopropenyl carbonate, B.P. 87°/95 mm., was submitted for purification by preparative scale gas chromatography and 10.9 g. of 99.4% pure material was isolated. The infrared spectrum of the compound has a band at $5.65\mu$ for carbonate and $5.95\mu$ for vinyl.

*Elemental analysis.*—Calculated (percent): C, 59.2; H, 7.04. Found (percent): C, 58.72; H, 6.77.

The polymers of this invention have utility for forming molded products, coatings, and the like. The following examples show typical polymerizations.

EXAMPLE III

To 1000 ml. of the divinyl carbonate produced in Example I there was added 8.5 mg. of azobis-isobutyronitrile (AZN), and the mixture was heated at 73° in a nitrogen atmosphere. A white, solid, brittle polymer formed in the course of several minutes.

EXAMPLE IV 1 g. of diisopropenyl carbonate and 2 milligrams of 2,2'-azobisisobutyronitrile were degassed and sealed in a glass tube under vacuum and placed in a bath ranging from 550–76° C. for 16 hours. The tube then contained a small amount of insoluble white powder which was filtered and vacuum dried. The infrared spectrum of the white poly(diisopropenyl carbonate) had a strong absorption at $5.60\mu$, for the carbonate group. The polymer melted at 195–210° to a clear liquid, without decomposition.

EXAMPLE V

Two ml. of DVC, 5 ml. of benzene, and 11.4 mg. of AZN, were heated at 76° C. in a sealed tube under vacuum for 2 hr. A white insoluble polymer formed, and after washing with methanol, 1.00 g. was obtained. An exothermic reaction in the polymer was observed by differential thermal analysis between 265 and 287° C. The infrared spectrum showed $$\frac{AbS\ 5.55\ microns}{AbSS.SS\ microns + AbS\ 5.72\ microns} = 0.40$$

$$\frac{5AbS\ 6.05\ microns}{AbS\ 5.55\ microns + AbS\ 5.72\ microns} = 0.50$$

EXAMPLE VI

The procedure in Example V was followed using acetone as the solvent, 20 ring of AZN, and irradiating the polymerization tube with ultraviolet light at 0° C. for 16 hr. 0.40 g. of polyDVC was obtained when the solution was poured into methanol. The infrared analysis showed $$\frac{A\ 5.55}{A\ 5.55 + A\ 5.72} = 0.12 \text{ and } \frac{5A\ 6.05}{A\ 5.55 + A\ 5.72} = 1.0$$

EXAMPLE VII

The procedure of Example V was followed using dimethylacetamide as solvent, and 10 mg. benzoyl peroxide as initiator at 90° C. for 3 hr. Upon pouring the solution into methanol, 0.85 g. of polyDVC were obtained. The infrared analysis showed $$\frac{A\ 5.55}{A\ 5.55 + A\ 5.72} = 0.60$$

and $$\frac{SA\ 6.05}{A\ 5.55 + A\ 5.72} = 0.47$$

The number average molecular weight was 1460.

EXAMPLE VIII

The procedure of Example V was followed using tetrahydrofuran as the solvent and 6 mg. of benzoyl peroxide as initiator at 90° C. Shortly after reaching 90°, the solution explosively polymerized to form a granular white product. After washing with methanol, 1.40 g. of polymer were obtained.

$$\frac{A\ 5.55}{A\ 5.55 + A\ 5.72} = 0.52 \text{ and } \frac{5A\ 6.05}{A\ 5.55 + A\ 5.72} = 0.30$$

Poly(divinylcarbonate) is of particular utility in being convertible to polyvinyl alcohol by alkaline hydrolysis using the techniques and catalysts used for converting polyvinyl acetate into polyvinyl alcohol. This is illustrated in the following example.

EXAMPLE IX

The poly(divinylcarbonate) prepared as described in Example III was suspended in boiling methanol which contained dissolved sodium, i.e. sodium methoxide. A weight of sodium about 5% of the weight of poly(divinylcarbonate) was used. The suspension was boiled for 20 hours. The supernatant was decanted from the polymer which was then washed several times with methanol and then dried. The infra-red spectrum of the resulting polymer was identical in all important respects with polyvinyl alcohol made in the conventional manner from polyvinyl acetate. The thermal properties of the polyvinyl alcohol were closely similar to those of the conventional polymer, as determined by differential thermal analysis.

EXAMPLE X

The polymer of Example VIII and other similarly prepared by explosive polymerization were pooled to give 21 g. of polyDVC. They were boiled overnight with methanol containing 1 g. of dissolved sodium; the solution was decanted and fresh methanol containing 1 g. dissolved sodium was added and the suspension boiled for another 5 hr. The solvent was decanted and the product washed with methanol and dried, giving 8 g. of PVA, as shown by the infrared spectrum of this product. A clear, tough film was cast from a water solution of this PVA. Since the initial polyDVC had about 50% of its carbonate groups in 5 memberd rings, the resultant PVA had 67% of its hydroxyl groups in 1,2-glycol units.

What is claimed is:

1. An addition homopolymer of a carbonate having the formula

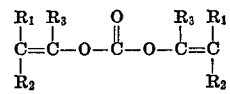

wherein $R_1$, $R_2$ and $R_3$ are hydrogen, phenyl or alkyl containing up to 20 carbon atoms.

2. A polymer of a carbonate as defined in claim 1, wherein $R_1$, $R_2$ and $R_3$ are hydrogen.

3. A polymer of a carbonate as defined in claim 1, wherein $R_3$ is methyl in each case.

References Cited

UNITED STATES PATENTS

| | | | |
|---|---|---|---|
| 2,370,589 | 2/1945 | Strain et al. | 260—77.5 |
| 2,410,305 | 10/1946 | Richter et al. | 260—77.5 |

OTHER REFERENCES

Murahashi et al., "Bull. Chem. Soc. Japan," vol. 38(11), November 1965, pp. 1905–1910.

SAMUEL H. BLECH, Primary Examiner

U.S. Cl. X.R.

260—431, 463